United States Patent
Forstall

(10) Patent No.: US 8,265,709 B2
(45) Date of Patent: Sep. 11, 2012

(54) SINGLE USER INPUT MECHANISM FOR CONTROLLING ELECTRONIC DEVICE OPERATIONS

(75) Inventor: Scott Forstall, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 929 days.

(21) Appl. No.: 12/115,774

(22) Filed: May 6, 2008

(65) Prior Publication Data

US 2008/0319562 A1    Dec. 25, 2008

Related U.S. Application Data

(60) Provisional application No. 60/936,965, filed on Jun. 22, 2007.

(51) Int. Cl.
*H04M 1/00* (2006.01)

(52) U.S. Cl. .................................. 455/569.1; 455/575.2

(58) Field of Classification Search .............. 455/550.1, 455/556.1, 557, 575.2, 41.2, 66.1, 569.1
See application file for complete search history.

(56) References Cited

U.S. PATENT DOCUMENTS

| | | | |
|---|---|---|---|
| 2005/0277438 A1* | 12/2005 | Tilk et al. ................... | 455/556.1 |
| 2006/0040638 A1* | 2/2006 | McQuaide, Jr. .............. | 455/403 |
| 2007/0041582 A1* | 2/2007 | Lam .............................. | 379/908 |
| 2008/0039072 A1* | 2/2008 | Bloebaum ..................... | 455/425 |
| 2008/0164934 A1 | 7/2008 | Hankey et al. | |
| 2008/0165986 A1 | 7/2008 | Daniels et al. | |
| 2008/0166003 A1 | 7/2008 | Hankey et al. | |
| 2008/0242378 A1* | 10/2008 | Lowles et al. .............. | 455/575.2 |
| 2010/0120366 A1* | 5/2010 | DeBiasio et al. ............ | 455/41.3 |

* cited by examiner

*Primary Examiner* — Nguyen Vo

(74) *Attorney, Agent, or Firm* — Kramer Levin Naftalis & Frankel LLP

(57) ABSTRACT

A unique input mechanism for controlling several operations of an electronic device is provided. Using the unique input mechanism, which may be the single input mechanism for providing user inputs to the electronic device, a user may provide different inputs or combinations of inputs to control different operations based on the current mode or capacity of the electronic device. For example, a single, short click of a button may control a media operation (e.g., play/pause) in a media mode, and the same input may control a telephony operation (e.g., initiate/terminate call) in a telephony mode. In some embodiments, different inputs may be associated with different types of operations. The unique input mechanism may include, for example, a button, a switch, a key, or an actuator.

49 Claims, 3 Drawing Sheets

| Button Press | Media playback operation | Communications operation |
|---|---|---|
| Once | Start/Stop | Initiate/Terminate
Hold and Switch |
| Twice | Advance to next media item | |
| Hold for 3 seconds | Fast-forward | Terminate and Switch |

FIG. 4

SINGLE USER INPUT MECHANISM FOR CONTROLLING ELECTRONIC DEVICE OPERATIONS

CROSS-REFERENCE TO RELATED APPLICATION

This application claims the benefit of prior filed U.S. Provisional Patent Application No. 60/936,965, filed Jun. 22, 2007, which is incorporated herein in its entirety.

BACKGROUND OF THE INVENTION

This invention is directed to a single user input mechanism for controlling the operations of an electronic device.

Some existing electronic devices can be controlled using several input mechanisms. For example, some personal media players, such as the iPod, include a scrolling mechanism and one or more buttons (e.g., a click-wheel) for controlling operations of the media player. As another example, some communications devices such as cellular telephones, may include several keys for dialing telephone numbers, initiating calls, and ending calls.

Typically, the input mechanism of an existing electronic device may be operative to control several device operations. In some embodiments, the electronic device may be coupled with a remote input device that includes, for example, one input mechanism for controlling a single electronic device operation (e.g., a rotary dial for controlling the volume of a personal electronic device), or a small number of input mechanisms (e.g., two or three buttons) for controlling a small number of electronic device operations (e.g., one button for play/pause, and one button for next). Because each of the input mechanisms controls only a single electronic device operation, the many input mechanisms may be bulky, expensive, and complex to create and to use.

It would be desirable, therefore, to provide a single, unique input mechanism by which a user may control several electronic device operations. It would also be desirable to provide a unique input mechanism by which a user can control many diverse, and unrelated electronic device operations.

SUMMARY OF THE INVENTION

A unique input mechanism by which a user may control several operations of an electronic device is provided.

The unique input mechanism may be coupled to the electronic device in any suitable manner. For example, the unique input mechanism may be incorporated in the electronic device. As another example, the unique input mechanism may be remote to the electronic device (e.g., coupled wirelessly or by a cable). The remote unique input mechanism may be incorporated in any suitable device such as, for example, a remote user input device (e.g., a remote controller), a communications device or accessory (e.g., a headset), or another electronic device.

The unique input mechanism may include any suitable single input mechanism that causes different operations to be executed in response to different interface events on the single input mechanism. For example, the unique input mechanism may include one of a button, a key, a switch and an actuator. The user may actuate the unique input mechanism in one of several manners. For example, the user may actuate the input mechanism for different lengths of time (e.g., a short press of a button or a 3-second long press of a button). As another example, the user may actuate the input mechanism using different sequences (e.g., a single press of a button or two presses of a button).

The electronic device may be operative to perform different operations in response to different inputs received from the unique input mechanism. For example, in response to a first input received from the unique input mechanism (e.g., a single press of a button), the electronic device may perform a media operation (e.g., play/pause media). As another example, in response to a second input received from the unique input mechanism, the electronic device may perform a communications operation (e.g., pick-up an incoming call, initiate a voice-activated call, or terminate a call).

BRIEF DESCRIPTION OF THE DRAWINGS

The above and other features of the present invention, its nature and various advantages will be more apparent upon consideration of the following detailed description, taken in conjunction with the accompanying drawings in which:

FIG. 4 shows a chart of illustrative associations of inputs provided using a single input mechanism and corresponding electronic device actions in accordance with one embodiment of the invention.

DETAILED DESCRIPTION

Figure 1:
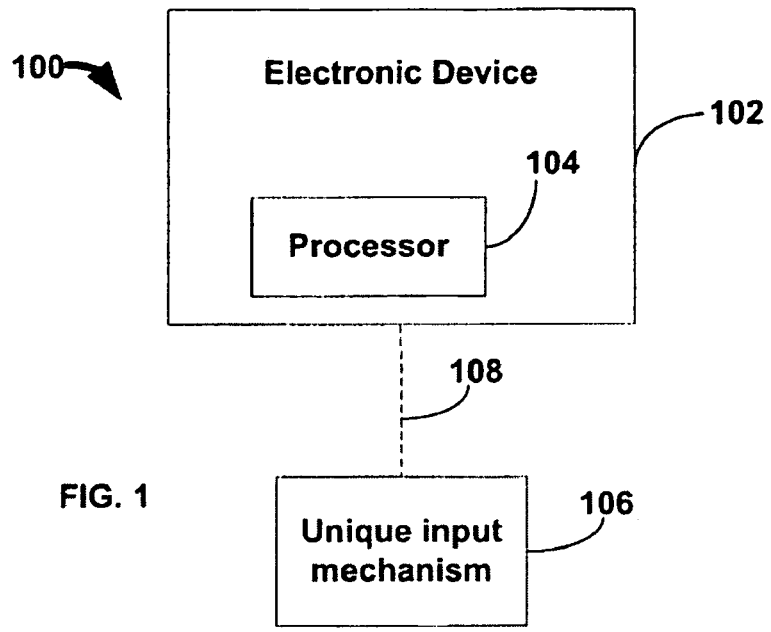
FIG. 1 shows a schematic view of an illustrative system that includes a unique input mechanism in accordance with one embodiment of the invention.

FIG. 1 shows a schematic view of an illustrative system that includes a unique input mechanism in accordance with one embodiment of the invention. System 100 may include electronic device 102. Electronic device 102 may be any electronic device that includes at least two operations that a user may control. Suitable electronic devices may include, for example, a computer, a cellular telephone, a mobile communications device, a personal media device, a set-top box, a television system, combinations thereof (e.g., the iPhone) or any other suitable electronic device.

The operations may be any suitable operations available using the particular electronic device. For example, if the electronic device is a personal media player, the operations may include, for example, at least two of play/pause, next, fast-forward, last, stop, volume up, volume down, or any other media playback operation. As another example, if the electronic device is a cellular telephone, the operations may include, for example, at least two of dial, connect, hang-up, hold, switch, mute, volume up, volume down, or any other telephony or communications operation. In yet another example, in a hybrid device having both media player and telephone functionality, the operations may include at least two of play/pause, next, last, stop, fast-forward, volume up, volume down, dial, connect, hang-up, hold, switch, mute, or any other media application, telephony or communications operation. Other operations that may be performed include, for example, a select operation and a menu access button.

Electronic device 102 may include control circuitry or processor 104 for performing the operations of electronic device 102. Processor 104 may be coupled to any other suitable component of electronic device 102. For example, processor 104 may be coupled to memory, a storage device, communications circuitry, a display, audio circuitry, a bus, an I/O component, or any other suitable component.

System 100 may include unique input mechanism 106 for providing user inputs to electronic device 102. Unique input mechanism 106 may be a single input mechanism operative to provide a signal to electronic device 102 in response to a user actuation of unique input mechanism 106. In some embodiments, unique input mechanism 106 may provide different signals based on the user's input (e.g., depending on the position of the button forming unique input mechanism 106). For example, electronic device 102 may receive and process a 0 or 1 signal, or identify the presence or absence of an electric signal.

In some embodiments, system 100 may include several unique input mechanisms 106 (e.g., several distinct buttons). For the purposes of this invention, it will be understood that in such a system, one of the several unique input mechanisms 106 may be used to receive different interface events to perform communications and media operations.

Unique input mechanism 106 may include any suitable button, key, actuator, switch, or other mechanism that provides at least two states. For example, unique input mechanism 106 may include a bend switch, as described in U.S. patent application publication No. 2008/0165986, published on Jul. 10, 2008, which is incorporated by reference herein in its entirety. As another example, unique input mechanism 106 may include an in-line switch, as described in U.S. Provisional Patent Application No. 60/879,155, filed Jan. 6, 2007, which is hereby incorporated by reference herein in its entirety.

Unique input mechanism 106 may be incorporated in a user input device (not shown) for controlling several operations of one or more electronic devices. For example, the user input device may be a remote control (e.g., a universal remote) coupled with one or more electronic devices (e.g., coupled with a television, a set-top box, a recording device, and a media player). In some embodiments, the user input device may include only the unique input mechanism. For example, the user input device may include a single button for controlling operations of electronic device 102. In some embodiments, the single button may be a dome switch.

In some embodiments, unique input mechanism 106 may be incorporated in a device that communicates (e.g., using wires or wirelessly) with electronic device 102. For example, if electronic device 102 includes cellular telephone capabilities, unique input mechanism 106 may be incorporated in a wireless headset (e.g., a Bluetooth headset). One suitable Bluetooth headset is described in U.S. Provisional Patent Application No. 60/879,177, filed Jan. 6, 2007, entitled "Wireless Headset", U.S. Provisional Patent Application No. 60/879,195, filed Jan. 6, 2007, entitled "Connector With Magnetic Detent", and U.S. Provisional Patent Application No. 60/879,193, filed Jan. 6, 2007, entitled "Acoustic Design of Earbud in a Headset", all of which are incorporated by reference herein in its entirety.

Unique input mechanism 106 may be coupled to electronic device 102 using communications link 108. Communications link 108 may be any suitable wired or wireless link. For example, communications link 108 may be a wire (e.g., a headset wire), a cable (e.g., a fiber optic cable), or a wireless path created using a suitable wireless communications protocol. Suitable wireless communications protocols may include, for example, Wi-Fi communications (e.g., one of the 802.11 standards), Bluetooth, Nordic, high frequency systems (e.g., 900 MHz, 2.4 GHz, and 5.6 GHz communication systems), short-range radio circuitry (e.g., walkie-talkie type circuitry), and infrared protocols.

In some embodiments, electronic device 102 may include a user input interface that includes one or more input mechanisms for controlling operations of the electronic device. In such embodiments, unique input mechanism 106 may be distinct from electronic device 102 (e.g., incorporated in a distinct device or user input device) such that unique input mechanism 106 is the only mechanism local to the device in which the mechanism is incorporated that may be operative to control several operations of electronic device 102. Thus, the user may perform different combinations of inputs (as described below in more detail) using unique input mechanism 106 to control several operations of electronic device 102.

In some embodiments, unique input mechanism 106 may be incorporated within electronic device 102 such that unique input mechanism 106 may be the only mechanism within electronic device 102 for controlling the operation of the electronic device. This approach may be used, for example, to provide rudimentary or basic operations control for an electronic device that is primarily controlled using a remote user input device (e.g., a television system that includes a single button on the television, where the television system is controlled using a remote control).

Figure 2:
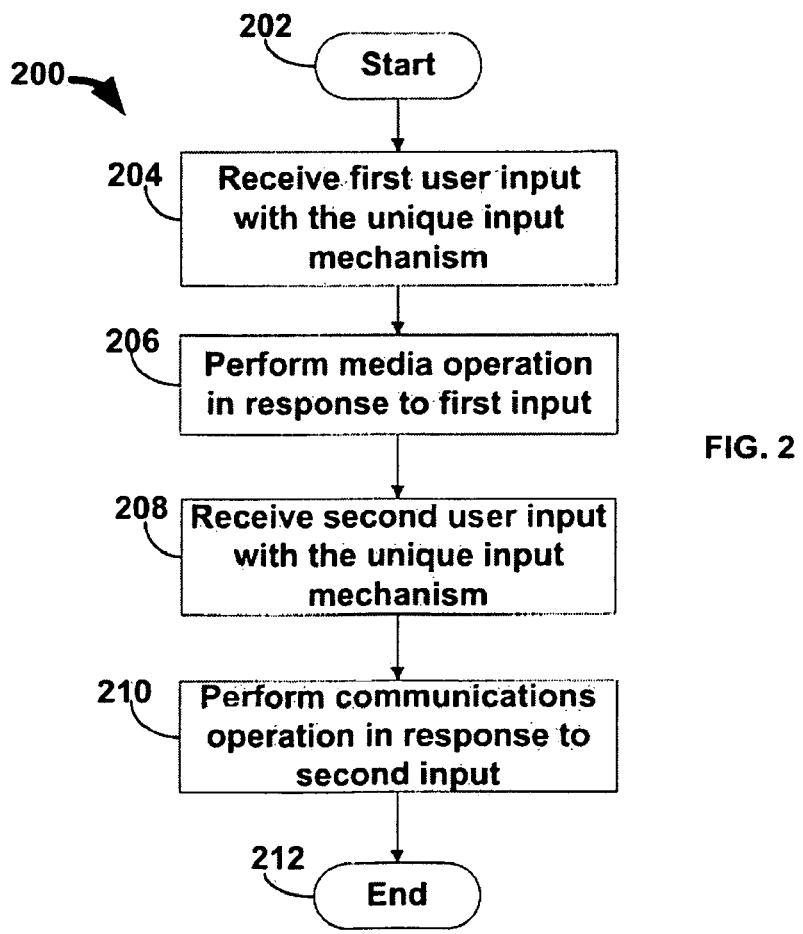
FIG. 2 shows a flow chart of an illustrative process for controlling media operations and communications operations in accordance with one embodiment of the invention.

The following flow charts describe various operations of an electronic device that a user may control using a unique input mechanism. FIG. 2 shows a flow chart of an illustrative process for controlling media operations and communications operations in accordance with one embodiment of the invention. Process 200 begins at step 202. At step 204, a first user input with the unique input mechanism may be received. For example, the electronic device (e.g., electronic device 102, FIG. 1) coupled with the unique input mechanism (e.g., unique input mechanism 106, FIG. 1) may detect a first user input with the unique user input mechanism. The first user input may be a change in the state of unique input mechanism 106 (e.g., pressing a button) that causes a signal to be received by electronic device 102. In some embodiments, the first user input may be a sequence of changes in state of unique input mechanism 106 (e.g., 2 pushes of a button, or an extended push of a button) that causes a sequence of signals or a specific signal to be received by electronic device 102.

At step 206, the electronic device may perform a media operation in response to the first input received at step 204. For example, electronic device 102 may start, stop or pause media available with the electronic device (e.g., start, stop or pause audio provided to a headset coupled to a media player). As another example, the electronic device may skip to the next or previous media item, fast-forward or rewind a media item available for playback, change the volume, load a playlist, modify a playlist, shuffle or un-shuffle the playlist, or any other suitable operation.

At step 208, a second user input with the unique input mechanism may be received. For example, electronic device 102 may receive a second input from unique input mechanism 106. The second input may be a change in state of unique input mechanism 106, or a sequence of changes in state of unique input mechanism 106. In some embodiments, the second user input may be different from the first user input. For example, the second user input may be a different change of state or sequence of changes of state of unique input mechanism 106 (e.g., one quick push of a button as opposed to a 3-second push of a button, or as opposed to two pushes of a button). Electronic device 102 may identify the different second input based on a signal received by the electronic device from unique input mechanism 106. For example, if the first input is a single push of a button, electronic device 102 may receive a single, short signal from unique input mechanism 106. If the second input is a three-second long push of a button, electronic device 102 may receive a single, longer signal from unique input mechanism 106 (e.g., a 3-second long signal).

At step 210, the electronic device may perform a communications operation in response to the second user input. For example, electronic device 102 may initiate or terminate a call, hold a call, switch between calls, mute audio, connect to or disconnect from a network (e.g., for Internet access), dial a number, initiate a voice-activated or voice-controlled call, decline a call, switch to another call, place a call on hold or any other suitable communications operation. In some embodiments, the communications operation may be any operation that may be performed by a cellular telephone or a mobile communications device. Process 200 then ends at step 212.

In some embodiments, the first and second inputs received at steps 204 and 208 may be the same (e.g., a single press of a button). Depending on the mode or capacity of the electronic device (e.g., media playback mode or telephony mode), the electronic device may interpret the input differently, and perform an operation based on the determined mode (e.g., perform a telephony operation if the electronic device is in the telephony mode, or alternatively perform a media playback operation because the electronic device is in the telephony mode).

Figure 3:
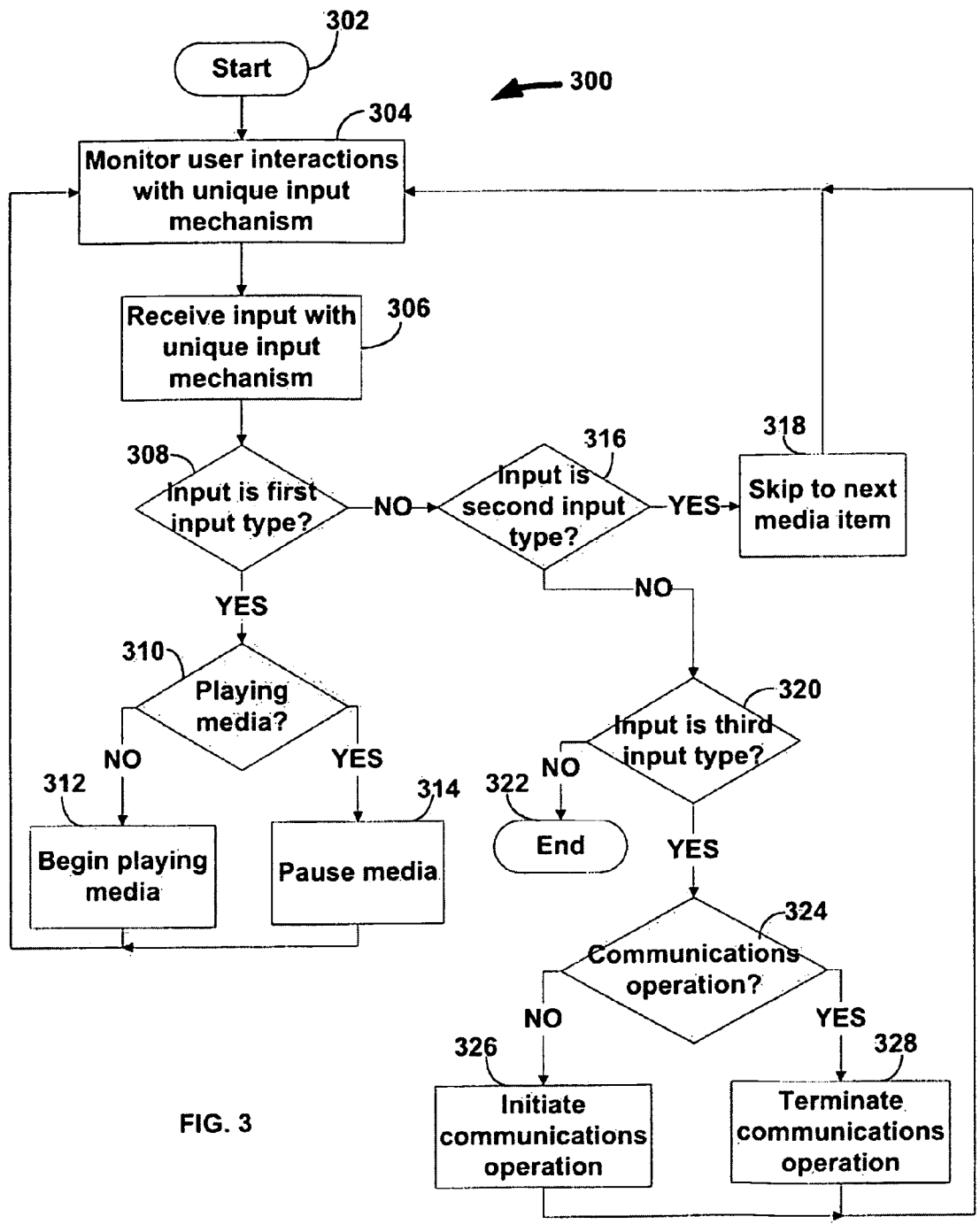
FIG. 3 shows a flowchart of an illustrative process for interacting with an electronic device using a unique input mechanism in accordance with one embodiment of the invention.

FIG. 3 shows a flowchart of an illustrative process for interacting with an electronic device using a unique input mechanism in accordance with one embodiment of the invention. Process 300 begins at step 302. At step 304, the electronic device may monitor user interactions with the unique input mechanism. For example, electronic device 102 (FIG. 1) may monitor signals received from unique input mechanism 106 (FIG. 1) to monitor user interactions with unique input mechanism 106. At step 306, the electronic device may receive an input with the unique input mechanism. For example, electronic device 102 may detect a signal (e.g., an electrical signal) provided by unique input mechanism 106.

At step 308, the electronic device may determine whether the input received at step 306 is a first input type. For example, electronic device 102 may determine whether the signal received from unique input mechanism 106 corresponds to the signal of a first input type. For example, the first input type may be a single press of a button (e.g., unique input mechanism 106 is a single button). The signal received from the button may be detected as a change in the state of the signal (e.g., from a high voltage to a low voltage signal), or a brief signal that may be transmitted while the button is pressed. If the electronic device determines that the input is the first input type, process 300 moves to step 310.

At step 310, the electronic device may determine whether it is playing media. For example, electronic device 102 may determine whether audio, video, or both is being provided to a user. If the electronic device determines that it is not playing media, process 300 moves to step 312. At step 312, the electronic device may begin to play media. For example, electronic device 102 may play the next media item on a playlist. As another example, the electronic device may play media from a particular folder or directory (e.g., a folder or directly previously selected using another input mechanism or input device). Process 300 then may move back to step 304, where user interactions with the unique input mechanism may be monitored.

If, at step 310, the electronic device instead determines that it is playing media, process 300 may move to step 314. At step 314, the electronic device may pause media that is being played. For example, electronic device 106 may pause media by ceasing to provide audio, video or both, and by retaining an indication of the current playback position of the media. Process 300 may then move back to step 304, where user interactions with the unique input mechanism may be monitored.

If, at step 308, the electronic device instead determines that the input is not the first input type, process 300 may move to step 316. At step 316, the electronic device may determine whether the input received at step 306 is a second input type. For example, electronic device 102 may determine whether the signal received from unique input mechanism 106 corresponds to the signal of a second input type. For example, the second input type may be two consecutive presses of a button (e.g., unique input mechanism 106 is a unique button). The signal received from the button may then be a two consecutive changes of the signal (e.g., from two high-to-low voltage changes), or a two consecutive brief signals that may be transmitted while the button is pressed. In some embodiments, electronic device 102 may recognize two consecutive presses of the button as the second signal (e.g., and not the first signal applied twice) only when the two presses are within a given time period (e.g., 1 or 2 seconds), only when each of the two presses last a given time period (e.g., within the 0.1 to 0.5 second window), or both. If the electronic device determines that the input is the second input type, process 300 may move to step 318.

At step 318, the electronic device may skip to the next media item available for playback. For example, electronic device 102 may skip to the next item in a playlist. As another example, electronic device 102 may skip to the next item in a folder or directory, or skip to the next folder or directory available in memory (e.g., to navigate memory of electronic device 102). In some embodiments, electronic device 102 may skip to the next media item whether a media item is being played or not. If a media item is currently played, electronic device 102 may play the next media item in response to the input of step 306. Similarly, if a media item is not currently played, electronic device 102 may not play the next media item in response to the input of step 306. Process 300 may then move back to step 304, where user interactions with the unique input mechanism may be monitored.

If, at step 316, the electronic device instead determines that the input is not the second input type, process 300 may move to step 320. At step 320, the electronic device may determine whether the input received at step 306 is a third input type. For example, electronic device 102 may determine whether the signal received from unique input device 106 corresponds to the signal of a third input type. For example, the third input type may be a single, extended press of a button (e.g., unique input mechanism 106 is a single button). The signal received from the button may be a single change of the signal that occurs over an extended period of time (e.g., a short circuit that lasts for at least a predetermined period of time), or a single, longer signal that may be transmitted while the button is pressed. In some embodiments, electronic device 102 may recognize the extended press of the button as the third signal (e.g., and not the first signal) only when the press lasts at least a predetermined time period (e.g., 2 or 3 seconds). If the electronic device determines that the input is not the third input type, process 300 moves to step 322.

At step 322, process 300 may terminate. In some embodiments, process 300 may return to step 304, where user interactions with the unique input mechanism may be monitored without performing any electronic device operation. In some embodiments, the electronic device may provide an indication of a misunderstood or mistaken input. For example, electronic device 102 may provide a visual indication (e.g., on a display of or coupled with electronic device 102) or an audio indication (e.g., a sound or error message on audio speakers, such as a headset, of electronic device 102).

If, at step 320, the electronic device instead determines that the input is the third type, process 300 may move to step 324. At step 324, the electronic device may determine whether it is performing a communications operation. For example, electronic device 102 may determine whether the user has initiated a call (e.g., a cellular telephone conversation, a video conference, or a voice over IP (VOIP) call). As another example, electronic device 102 may determine whether the user is accessing or transmitting data over a communications network (e.g., surfing the Internet, transferring a file, sending e-mail, sending a text message or media message (SMS or MMS), or streaming or downloading data, for example media, over the communications network). If the electronic device determines that it is not performing a communications operation, process 300 may move to step 326.

At step 326, the electronic device may initiate a communications operation. For example, electronic device 102 may initiate a call, start a data transmission, or connect to a communications network (e.g., connect to the Internet). As another example, electronic device 102 may dial a number (e.g., redial the last number that was dialed or received by electronic device 102) or enter an address to access data available from the address (e.g., enter a URL to access a webpage over the Internet).

As still another example, electronic device 102 may initiate a voice-activated or voice-controlled call. Electronic device 102, in response to receiving the user input, may monitor incoming audio (e.g., from a microphone) to identify a number to dial (e.g., identify a name associated with a number, or identify a number). If electronic device 102 cannot identify the number to dial, electronic device 102 may prompt the user to attempt again to identify the number, or may not perform any operation. Once electronic device 102 identifies the number, electronic device 102 may dial the identified number. In some embodiments, the user may similarly initiate any other suitable voice-activated or voice-controlled communications operation. As yet still another example, electronic device 102 may mute or unmute audio, change the volume of the communications operation, or perform any other suitable operation.

In some embodiments, electronic device 102 may determine that it is receiving an incoming communications request, such as for example an incoming telephone call. Electronic device 102 may then indicate the incoming communications request to the user, for example using an audio indication, a visual indication, or both. In response to receiving a user input of the third type while an incoming communications is requested, electronic device 102 may initiate a communications operation with the source of the incoming communication request (e.g., pick-up an incoming telephone call, stream requested media, or download a file). After step 326, process 300 may move back to step 304, where user interactions with the unique input mechanism may be monitored.

If, at step 324, the electronic device instead determines that it is performing a communications operation, process 300 may move to step 328. At step 328, the electronic device may terminate the ongoing communications operation. For example, electronic device 102 may hang-up a call (e.g., a cellular telephone or VOIP call, or a video conference), or cease transmitting or receiving data over a communications network (e.g., close data ports for surfing the Internet, transferring a file, sending e-mail, sending an SMS or MMS, or streaming or downloading data). Process 300 may then move back to step 304, where user interactions with the unique input mechanism may be monitored.

In some embodiments, the electronic device may instead associate the same received inputs (e.g., the first, second and third inputs of process 300) with different communications or media playback operations based on the current mode of the electronic device. For example, if the electronic device is in a media playback mode, the electronic device may treat received inputs as instructions to perform media playback operations. For example, the electronic device may play/pause media in response to receiving a signal reflecting a single, short press of the button (the first input), skip to the next media item in response to receiving a signal reflecting two short presses of the button (the second input), and may fast-forward the current media item in response to receiving a signal reflecting a single, long press of the button (the third input).

Similarly, if the electronic device is in a telephony or communications mode (e.g., the electronic device is performing a communications operation), the electronic device may treat received inputs as instructions to perform communications operations. For example, the electronic device may initiate or terminate a communication (e.g., pick up or hang up a telephone call) in response to receiving a signal reflecting a single, short press of the button (the first input), and decline an incoming communications request (e.g., decline an incoming call) in response to receiving a signal reflecting a single, long press of the button (the third input). In some embodiments, the electronic device may perform different operations based on signals reflecting the same input based on the current communications or telephony operation being performed while in the communications mode. For example, while already performing a communications operation (e.g., on a telephone call), if a communications request is received (e.g., another call comes in on another line), the electronic device may switch to the other line and hold the initial communications operation in response to receiving a signal reflecting a single, short press of the button (the first input), and the electronic device may switch to the other line and terminate the initial communications operation in response to receiving a signal reflecting a single, long press of the button (the third input).

FIG. 4 shows a chart of illustrative associations of inputs provided using a single input mechanism and corresponding electronic device operations in accordance with one embodiment of the invention. The user inputs in chart 400 will be described as button presses. It will be understood, however, that any other input provided by a unique input mechanism may be used. Chart 400 may include column 402 of button presses, and column 404 of associated media playback operations (e.g., for use while in media playback mode), and column 406 of communications operations (e.g., for use while in communications mode). The first button press of column 402 may be single press 410. For example, the user may quickly press a dome switch, a bend switch, or any other suitable button or switch once. Single press 410 may be associated with start/stop operation 412 in a media playback mode. For example, in response to a single press of the button, the electronic device may start or stop playing back media (e.g., play media if it is currently stopped, or stop media if it is currently playing).

Single press 410 may be associated with initiate/terminate operation 414 in a communications mode. For example, in response to a single press of the button, if an incoming telephone call is being received, the call may be picked up, or if a call is ongoing, the call may be ended in response to a single press of the button. In addition, single press 410 may be associated with hold and switch operation 416. For example, in response to receiving an incoming telephone call during an ongoing telephone call, the ongoing telephone call may be placed on hold and the incoming telephone call may be picked up in response to a single press of the button. The user may then switch back to the other call with subsequent single presses 410 of the button.

The second button press of column 402 may be double press 420. For example, the user may quickly press a dome switch, a bend switch, or any other suitable button or switch twice consecutively. Double press 420 may be associated with next operation 422 in a media playback mode. For example, in response to a double press of the button, the electronic device may advance to the next media item (e.g., of a currently loaded playlist). The electronic device may or may not play the next media item (e.g., play the next item if the current item is being played, and not play the next item if the current item is not being played).

In some embodiments, double press 420 may not be associated with any communications operation, for example to avoid users accidentally terminating ongoing communications operations by failing to press the button twice at the correct speed or rate. Alternatively, a double press of the button may be associated with any suitable communications operation.

The third button press of column 402 may be extended press 430. For example, the user may press a dome switch, a bend switch, or any other suitable button or switch for a given time period (e.g., 3 seconds). Extended press 430 may be associated with fast-forward operation 432 in a media playback mode. For example, in response to a single, long press of the button, the electronic device may fast-forward the media item currently being played back. If the electronic device reaches the end of the media item, the electronic device may end the fast-forward operation (e.g., and play back the next media item), or start fast-forwarding the next media item).

Extended press 430 may be associated with terminate and switch operation 434 in a communications mode. For example, in response to a single, long press of the button, the electronic device may end an ongoing telephone call and switch to an incoming call on another line. The extended press may be used, for example, while another call is on hold, to end the current call and return to the previous call (now on hold).

The above described embodiments of the present invention are presented for purposes of illustration and not of limitation, and the present invention is limited only by the claims which follow.

What is claimed is:

1. A method for using a unique user input mechanism to control a plurality of electronic device operations of an electronic device, the method comprising:
   receiving a user input with the unique user input mechanism;
   in response to the receiving the user input, determining a type of the received user input; and
   in response to the determining the type of the received user input:
   when the determined type of the received user input is a first input type, determining whether the electronic device is currently performing a first operation of a first mode of the electronic device; and
   when the determined type of the received user input is a second input type, determining whether the electronic device is currently performing a second operation of a second mode of the electronic device.

2. The method of claim 1, wherein the unique user input mechanism is wirelessly coupled to the electronic device using a wireless communications protocol.

3. The method of claim 1, wherein the unique user input mechanism is coupled to the electronic device using a cable.

4. The method of claim 1, wherein the unique user input mechanism is one of a button, a switch, a key and an actuator.

5. The method of claim 1, wherein the first mode comprises a media mode, and wherein the first operation comprises a play operation.

6. The method of claim 1, wherein the second mode comprises a communications mode, and wherein the second operation comprises at least one of an in-call operation and receiving an incoming call.

7. The method of claim 1, wherein the unique user input mechanism is a part of a headset that is coupled to the electronic device, and wherein the only user input mechanisms of the headset are the unique user input mechanism and a microphone.

8. The method of claim 1, wherein the first input type and the second input type differ from one another only in one of a duration of a single contact of the unique user input mechanism by a user and a quantity of consecutive contacts of the unique user input mechanism by the user.

9. The method of claim 1, wherein:
   the unique user input mechanism comprises a single button;
   the first input type comprises a single short press of the single button; and
   the second input type comprises a single long press of the single button.

10. The method of claim 1, wherein the determining whether the electronic device is currently performing the first operation occurs only when the determined type of the received user input is the first input type.

11. The method of claim 1, wherein the determining whether the electronic device is currently performing the second operation occurs only when the determined type of the received user input is the second input type.

12. A system for controlling operations, the system comprising:
   control circuitry;
   an electronic device; and
   a single input mechanism for providing user inputs to the electronic device, wherein the control circuitry is operative to:
   receive a user input from the single input mechanism;
   determine a type of the received user input;
   when the determined type of the received user input is a first input type, determine whether the electronic device is currently performing a first operation of a first mode of the electronic device; and
   when the determined type of the received user input is a second input type, determine whether the electronic device is currently performing a second operation of a second mode of the electronic device.

13. The system of claim 12, wherein the first mode comprises a media mode, and wherein the first operation comprises a one of a play, pause, stop, back, and next operation.

14. The system of claim 12, wherein the second mode comprises a communications mode, and wherein the second operation comprises at least one of an in-call operation and receiving an incoming call.

15. The system of claim 12, wherein the first input type comprises a single, short actuation of the single input mechanism.

16. The system of claim 12, wherein the second input type comprises a single, long actuation of the single input mechanism.

17. The system of claim 12, wherein the single input mechanism is the only input mechanism that is remotely coupled to the electronic device and operative to control operations of the electronic device.

18. The system of claim 12, wherein the first input type and the second input type differ from one another only in one of a duration of a single contact of the single input mechanism by a user and a quantity of consecutive contacts of the single input mechanism by the user.

19. A method for controlling media operations and communications operations of an electronic device using a unique user input mechanism for providing user inputs to the electronic device, the method comprising:
   receiving a user input with the unique user input mechanism;
   in response to the receiving, determining a type of the received user input;
   in response to a determination that the type of the received user input comprises a first type of a plurality of types, determining whether the electronic device is performing a first communications operation during the receiving;
   in response to a determination that the electronic device is performing the first communications operation during the receiving, terminating the first communications operation of the electronic device;
   in response to a determination that the electronic device is not performing the first communications operation during the receiving, determining whether the electronic device is performing a first media operation during the receiving;
   in response to a determination that the electronic device is performing the first media operation during the receiving, manipulating the first media operation; and
   in response to a determination that the electronic device is not performing the first media operation during the receiving, initiating a second communications operation of the electronic device.

20. The method of claim 19 further comprising:
   in response a determination that the type of the received user input comprises a second type of the plurality of types, determining whether media is currently being played back by the electronic device; and
   in response to a determination that media is currently being played back, pausing the currently played back media.

21. The method of claim 19 further comprising:
   in response to a determination that the type of the received user input comprises a second type of the plurality of types, determining whether media is currently being played back by the electronic device; and
   in response to a determination that media is not currently being played back, playing back media.

22. The method of claim 19, wherein the initiating the second communications operation comprises initiating an outgoing telephone call using the electronic device.

23. The method of claim 22, wherein the initiating the outgoing telephone call comprises redialing the last telephone number that was at least one of previously dialed and previously received by the electronic device.

24. The method of claim 19, wherein the initiating the second communications operation comprises entering an address to access a webpage over the Internet using the electronic device.

25. The method of claim 19, wherein the electronic device is coupled to a headset that comprises a microphone, and wherein the initiating the second communications operation comprises monitoring the microphone for user audio input to initiate a voice-controlled communications operation.

26. The method of claim 25, wherein the only user input mechanisms of the headset are the unique user input mechanism and the microphone.

27. The method of claim 19, wherein the unique user input mechanism is a part of a headset that is coupled to the electronic device.

28. The method of claim 19, wherein the first media operation comprises playing back a media item, and wherein the manipulating the first media operation comprises fast forwarding the playback of the media item.

29. The method of claim 19 further comprising:
   in response to a determination that the type of the received user input comprises a second type of the plurality of types, manipulating a particular media operation that the electronic device is performing.

30. The method of claim 29, wherein the particular media operation comprises playing back a first media item of a plurality of media items, and wherein the manipulating the particular media operation comprises skipping to play back a second media item of the plurality of media items.

31. The method of claim 19, wherein the first communications operation comprises an ongoing call.

32. The method of claim 19, wherein the first type and a second type of the plurality of types differ from one another only in one of a duration of a single contact of the unique user input mechanism by a user and in a quantity of consecutive contacts of the unique user input mechanism by the user.

33. The method of claim 19, wherein:
   the unique user input mechanism comprises a single button;
   the plurality of types further comprises a second type and a third type;
   one of the first type, the second type, and the third type comprises a single short press of the single button;
   another one of the first type, the second type, and the third type comprises a double short press of the single button; and
   yet another one of the first type, the second type, and the third type comprises a single long press of the single button.

34. The method of claim 19, wherein:
   the unique user input mechanism comprises a single button;
   the plurality of types further comprises a second type and a third type;
   the first type comprises a single long press of the single button;
   the second type comprises a single short press of the single button; and
   the third type comprises a double short press of the single button.

35. A portable electronic device having telephone functionality and media playback functionality, and operative to receive signals from a headset having a single button, the electronic device comprising control circuitry that is operative to:
   receive at least one signal from the headset, wherein the at least one signal corresponds to a user input to the single button;
   process the received at least one signal to determine a type of the user input;
   in response to a determination that the type of the user input corresponds to a first type of a plurality of types, determine whether the electronic device is performing a first communications operation when the at least one signal is received;

in response to a determination that the electronic device is performing the first communications operation when the at least one signal is received, terminate the first communications operation of the electronic device;

in response to a determination that the electronic device is not performing the first communications operation when the at least one signal is received, determine whether the electronic device is performing a first media operation when the at least one signal is received;

in response to a determination that the electronic device is performing the first media operation when the at least one signal is received, manipulate the first media operation; and in response to a determination that the electronic device is not performing the first media operation when the at least one signal is received, initiate a second communications operation of the electronic device.

36. The portable electronic device of claim 35, wherein the second communications operation comprises an outgoing telephone call, and wherein the control circuitry is operative to initiate the second communications operation by dialing a telephone number using the telephone functionality of the electronic device.

37. The portable electronic device of claim 35, wherein the second communications operation comprises accessing a web page over the Internet, and wherein the control circuitry is operative to initiate the second communications operation by entering an address of the web page.

38. The portable electronic device of claim 35, wherein the headset comprises a microphone for capturing user audio input, wherein the electronic device receives the captured user audio input from the headset, and wherein the control circuitry is operative to initiate the second communications operation by dialing a number based on the received user audio input.

39. A method for using a unique user input mechanism of a headset to control an electronic device that is coupled to the headset, the method comprising:

receiving a user input with the unique user input mechanism;

in response to the receiving, determining a type of the received user input;

in response to a determination that the type of the received user input comprises a first type of a plurality of types, determining whether the electronic device is performing a first communications operation during the receiving;

in response to a determination that the electronic device is performing the first communications operation during the receiving, terminating the first communications operation of the electronic device;

in response to a determination that the electronic device is not performing the first communications operation during the receiving, initiating a second communications operation of the electronic device, wherein the initiating comprises activating a microphone of the headset.

40. The method of claim 39, wherein the activating the microphone comprises monitoring for user voice control signals that are incoming to the microphone to identify a telephone number to dial.

41. The method of claim 40 further comprising, in response to identifying the telephone number to dial, dialing the identified telephone number.

42. The method of claim 39, wherein the microphone and the unique user input mechanism of the headset are the only user input mechanisms of the headset.

43. The method of claim 39, wherein the first communications operation comprises one of an ongoing call and receiving an incoming call.

44. The method of claim 39, wherein the first type and a second type of the plurality of types differ from one another only in one of a duration of a single contact of the unique user input mechanism by a user and a quantity of consecutive contacts of the unique user input mechanism by the user.

45. The method of claim 39, wherein:
the unique user input mechanism comprises a single button;
the plurality of types further comprises a second type and a third type;
one of the first type, the second type, and the third type comprises a single short press of the single button;
another one of the first type, the second type, and the third type comprises a double short press of the single button; and
yet another one of the first type, the second type, and the third type comprises a single long press of the single button.

46. The method of claim 39, wherein:
the unique user input mechanism comprises a single button;
the plurality of types further comprises a second type and a third type;
the first type comprises a single long press of the single button;
the second type comprises a single short press of the single button; and
the third type comprises a double short press of the single button.

47. A system comprising:
a headset comprising:
a microphone for receiving audio signals; and
a unique user input mechanism for detecting a user input; and
an electronic device that is coupled to the headset, the electronic device comprising control circuitry that is operative to:
receive the detected user input from the headset;
determine a type of the received user input;
in response to a determination that the type of the received user input comprises a first type of a plurality of types, determine whether the electronic device is performing a first communications operation when the detected user input is received;
in response to a determination that the electronic device is performing the first communications operation when the detected user input is received, terminate the first communications operation of the electronic device;
in response to a determination that the electronic device is not performing the first communications operation when the detected user input is received, initiate a second communications operation of the electronic device by instructing the headset to activate the microphone.

48. The system of claim 47, wherein the control circuitry is operative to instruct the headset to activate the microphone by instructing the headset to monitor for user voice control signals that are incoming to the microphone to identify a telephone number to dial.

49. The system of claim 48, wherein the control circuitry is further operative to dial the identified telephone number.

* * * * *